United States Patent [19]
Ueda et al.

[11] 4,410,909
[45] Oct. 18, 1983

[54] METHOD FOR AUTOMATICALLY DETERMINING REPRODUCTION PICTURE COLOR CONTROL CONDITIONS

[75] Inventors: Sadao Ueda, Shiga; Isao Tokura, Uji; Mitsuhiko Yamada, Kyoto, all of Japan

[73] Assignee: Dainippon Screen Seizo Kabushiki Kaisha, Kyoto, Japan

[21] Appl. No.: 214,994

[22] Filed: Dec. 10, 1980

[30] Foreign Application Priority Data

Dec. 17, 1979 [JP] Japan .................................. 54-163805

[51] Int. Cl.³ .................................................. H04N 1/46
[52] U.S. Cl. ........................................ 358/75; 358/78; 358/80
[58] Field of Search .................................. 358/75, 78, 80

[56] References Cited

U.S. PATENT DOCUMENTS

| | | | |
|---|---|---|---|
| 4,032,969 | 6/1977 | Ueda | 358/80 |
| 4,096,519 | 6/1978 | Hoffrichter | 358/80 |
| 4,236,174 | 11/1980 | Gall | 358/80 |
| 4,300,158 | 11/1981 | Morgenfruh | 358/80 |
| 4,305,094 | 12/1981 | Yamada | 358/80 |

*Primary Examiner*—Michael A. Masinick
*Attorney, Agent, or Firm*—Birch, Stewart, Kolasch & Birch

[57] ABSTRACT

A method for automatically determining the color control conditions such as a highlight point, shadow point, a gradation control, color correction, and so forth, for a picture reproduction for use in a picture reproducing machine such as a color scanner and a color facsimile, wherein an original picture is scanned photoelectrically to pick up color separation picture signal data of the primary colors. The signal data is classified into groups to obtain a distribution condition, and according to the distribution condition obtained the color control conditions are determined.

10 Claims, 10 Drawing Figures

FIG. I
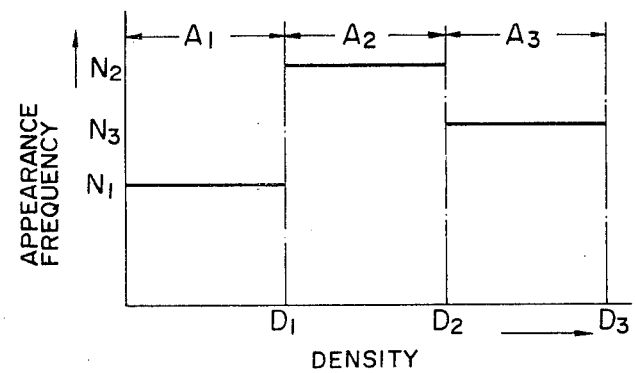
FIG. 2
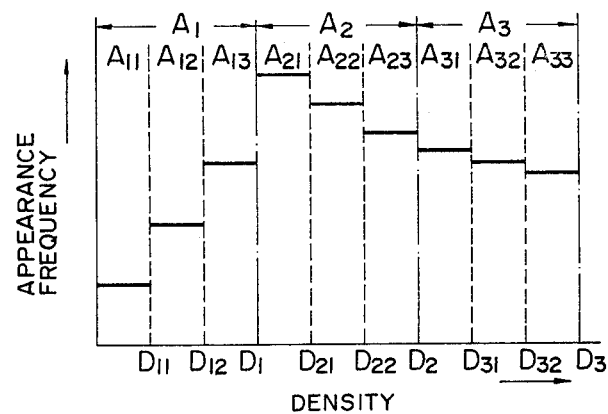
FIG. 3
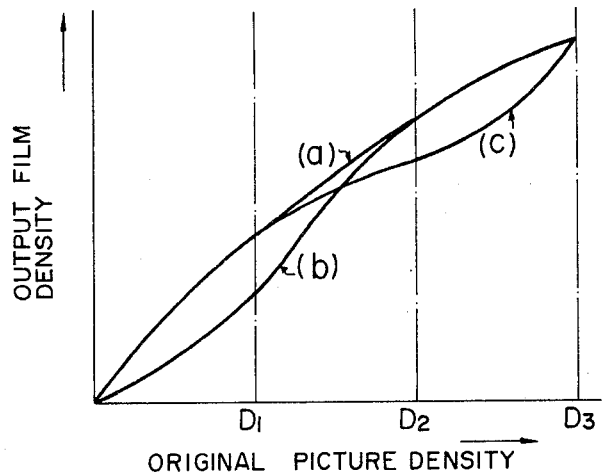

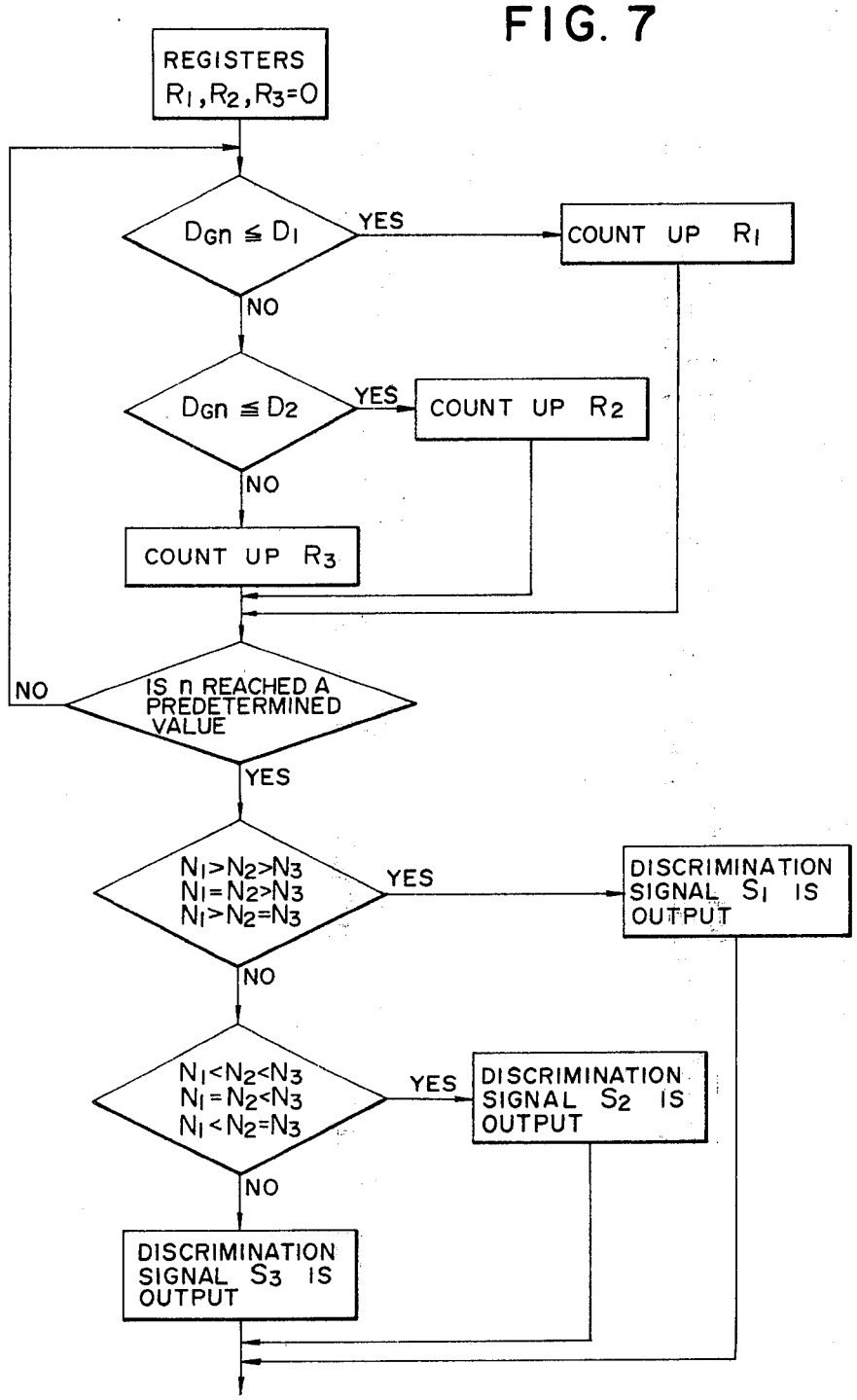

METHOD FOR AUTOMATICALLY DETERMINING REPRODUCTION PICTURE COLOR CONTROL CONDITIONS

BACKGROUND OF THE INVENTION

This invention relates to a method for automatically determining color control conditions such as a highlight point, a shadow point, gradation control, color correction, and so forth, for color separation films or plates of primary colors for use in a picture reproducing machine.

Generally, when an original picture is color-separated by a picture reproducing machine such as a color scanner and a color facsimile device to obtain color separation films or plates, since the density range of the original color picture is generally different from the reproducible density range of the picture reproducing machine, proper highlight and shadow points in the original picture are selectively determined, and thereafter their densities are adjusted to the picture reproducing machine, thereby adjusting the density range of the original picture to the reproducible density range of the picture reproducing machine. Then, when the color separation films are made by the picture reproducing machine, in order to reproduce a better reproduction picture, the gradation control, the color correction, and so forth, are also performed.

Even by a skilled operator it is not easy to set up such basic color control conditions such as the highlight point, the shadow point, the gradation control, the color correction, and so forth, of the picture reproducing machine such as a color scanner.

When the highlight point and the shadow point on the original picture, in particular, a 35 mm film which is often used nowadays, are selected, it is difficult to distinguish the highlight and the shadow points from others having similar intermediate densities, and to distinguish a highlight point from a catchlight point. Further, there are some points very similar in appearance, in the same original picture, and thus it requires great skill to determine the highlight and the shadow points. The operator is likely to make a mistake.

As regards the gradation control, no standard method has heretofore been realized, and now, in practice, the operator judges and determines the tone of the original picture by himself, and accordingly he is likely to make a mistake.

In addition, concerning the color correction, when the color of the certain area of the original picture is changed, or a delicate color correction is required, in practice, it is done by the operator while he observes a monitor or the output values of the picture reproducing machine, or by a skilled operator according to his knowledge and experience. Hence, he is also apt to make a mistake.

SUMMARY OF THE INVENTION

It is an object of the present invention to provide a method for automatically determining color control conditions such as a highlight point, a shadow point, gradation control, color correction, and so forth, for a picture to be reproduced for use in a picture reproducing machine wherein an original picture is scanned photoelectrically to pick up color separation picture signal data of the primary colors, free from the aforementioned defects, which is quick, reliable, and economic.

According to the present invention there is provided a method for automatically determining color control conditions for a picture to be reproduced for use in a picture reproducing machine wherein an original picture is scanned photoelectrically to pick up color separation picture signal data of the primary colors, comprising the steps of (a) classifying the color separation picture signal data into groups to obtain a distribution condition, and (b) determining color control conditions according to the distribution condition.

BRIEF DESCRIPTION OF DRAWINGS

In order that the present invention may be better understood, a preferred embodiment will be described with reference to the accompanying drawings, in which:

FIG. 1 shows a frequency distribution diagram of density of an original picture for explaining a method according to the present invention;

FIG. 2 also shows a frequency distribution diagram of density of an original picture, like FIG. 1, wherein the density is divided smaller ranges than that in FIG. 1;

FIG. 3 shows examples of reproducible gradation curves;

FIGS. 6a, 6b and 7 show flow charts of the operations to be performed by the machine represented by the operational means shown in FIG. 5;

DESCRIPTION OF A PREFERRED EMBODIMENT

Figure 4:
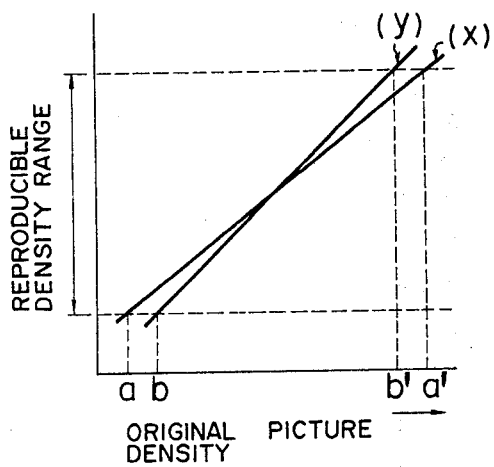
FIG. 4 shows two examples of an original picture density correction curve.

In order to determine highlight and shadow points, the entire surface of an original picture is consecutively scanned photoelectrically to obtain three color separation signals $D_R$, $D_G$ and $D_B$ of primary colors. Then, according to these color separation signals the area of the portion which has a certain density and is to be a highlight or a shadow point, is calculated, and then the highlight or the shadow point is determined when the calculated area is larger than a predetermined value.

When these points exist in the same original picture, a point where the three color separation signals $D_R$, $D_G$ and $D_B$ are well-balanced, i.e. whose color is closest to the gray color, is selected as the highlight or the shadow point. The density of the point selected will be the density of the highlight or the shadow point, as described later.

Then, a gradation correction is performed by a proper gradation curve as follows.

An appearance frequency of the densities in a certain density range is obtained by using the color separation signals $D_R$, $D_G$ and $D_B$. For example, as shown in FIG. 1, the entire density range of the original picture is divided into three density ranges $A_1$, $A_2$ and $A_3$. The density of each sampling picture element is compared with upper border densities $D_1$, $D_2$ and $D_3$ of the density ranges $A_1$, $A_2$ and $A_3$, and then, depending on the comparison result, each sampling picture element is classified in one of the density ranges $A_1$, $A_2$ and $A_3$, thereby counting the sampling picture element number included in each of the density ranges $A_1$, $A_2$ and $A_3$.

That is, when the densities D of the sampling picture elements in a certain portion of the original picture are in the following range: $0 \leqq D < D_1$; $D_1 \leqq D < D_2$; or $D_2 \leqq D < D_3$, a register $R_1$, $R_2$ or $R_3$ corresponding to the density range $A_1$, $A_2$ or $A_3$ counts up consecutively from zero, thereby obtaining a frequency distribution diagram of density shown in FIG. 1.

However, from such a frequency distribution diagram of density, only a rough gradation of the original picture, i.e. a high tone, a normal tone or a low tone, is known.

Then, for example, as shown in FIG. 2, each density range $A_1$, $A_2$ or $A_3$ is further divided into three density sub-ranges $A_{11}$, $A_{12}$ and $A_{13}$; $A_{21}$, $A_{22}$ and $A_{23}$; or $A_{31}$, $A_{32}$ and $A_{33}$, with upper sub-border densities $D_{11}$ and $D_{12}$; $D_{21}$ and $D_{22}$; or $D_{31}$ and $D_{32}$. The density of each sampling picture element is compared with the upper border and the upper subborder densities of the density sub-ranges, and then each sampling picture element is classified depending on the comparison result in the same manner as described above, thereby obtaining another frequency distribution diagram of density.

In the frequency distribution diagram of FIG. 2, the gradation of the original picture, which is roughly discriminated, is more precisely known. For example, in the sub-ranges $A_{21}$ and $A_{22}$, i.e. between the density ranges $D_1$ and $D_{22}$, the sampling picture elements to be reproduced are mostly concentrated. Therefore, in this case, the reproducible gradation is normal tone and the density range between $D_1$ and $D_{22}$ is to be emphasized. A reproducible gradation curve shown in FIG. 3(b) is used for the gradation correction of the original picture.

Accordingly, the appearance frequencies $N_1$, $N_2$ and $N_3$ of the density ranges $A_1$, $A_2$ and $A_3$ of FIG. 1 are compared with one another, and, when the appearance frequencies $N_1$, $N_2$ and $N_3$ are expressed as follows, for example, $N_1 > N_2 > N_3$; $N_2 > N_1$ and $N_2 > N_3$; or $N_1 > N_2 > N_3$, the gradation of the original picture of the high tone, the normal tone, or the low tone is roughly determined.

Then, the appearance frequencies of the density sub-ranges $A_{11}$–$A_{33}$ of FIG. 2 are compared with one another in the same manner as above, so that a reproducible gradation curve in which a gradation correction is carried out in a density range of high frequency, may be readily determined.

For example, in FIG. 3 there are shown three reproducible gradation curves, i.e. a standard normal tone (a), and partly-corrected normal tones (b) and (c), which are prepared in advance depending on the frequency distribution diagram shown in FIG. 2. One of them is selected depending on the frequency distribution characteristics of the density.

Generally, the frequency distribution for use in the gradation correction is preferably obtained by using the green color separation density signal $D_G$ whose density is the closest to the visibility density of a monochromatic picture image. Alternatively, a density $D = \alpha \cdot D_R + \beta \cdot D_G + \gamma \cdot D_B$, wherein $\beta > \alpha$ or $\gamma$, which is the closest value to the visibility density of the monochromatic picture image, is properly determined, and then, according to this density D, a frequency distribution may be obtained.

When the density range of the original picture is outside the standard reproducible density range of a picture reproducing machine such as a color scanner, the parts corresponding to the density range outside the reproducible density range cannot be reproduced. In such a case, the original picture density range outside the standard reproducible density range is simply converted to the maximum or the minimum value of the reproducible density range so that the parts corresponding to the original picture density range outside the standard reproducible density range may be reproduced in the form of halftone dot of the maximum or the minimum density, for example, 95% or 5% of halftone dot, of the reproducible density range. As occasion demands, it may be 100% or 0% of halftone dot.

Alternatively, in order to adjust the original picture density range outside the standard reproducible density range, the entire density ranges of the original picture and the reproduction picture are adapted to correspond to each other.

For example, as shown in FIG. 4, an original picture density range between a–a' or b–b' including a part outside the standard reproducible density range of the picture reproducing machine, is transformed to the reproducible density range by a line x or y.

Then, a color correction is carried out as follows. In practice, the color correction operation for plate-making comprises a basic masking operation which is required for every original picture, and a partial color correction operation which corrects a certain color of the original picture. In this embodiment the former will be described.

In order to perform such a color correction, i.e. to determine a proper gradation, picture signal data v, m, o, y, g and c divided into violet, magenta, orange, yellow, green, and cyan colors in hue are obtained by using the color separation density signals $D_R$, $D_G$ and $D_B$ in a digital manner, as disclosed in Japanese Patent Publication No. 50-14845.

Then, the frequency distribution of the density of each of the picture signal data of the six colors is obtained, and according to the frequency distribution of the density the gradation curve is obtained in the same manner as described above. Further, in order to adjust the picture signal density range outside the standard reproducible density range, the transformation of the density range of the picture signal data to the reproducible density range is carried out in the same manner, as described above. This method is especially effective when a large number of sampling picture elements gathered in a density range which is outside the standard reproducible density range of the picture reproducing machine and is the center of the picture pattern of the original picture.

Figure 5:
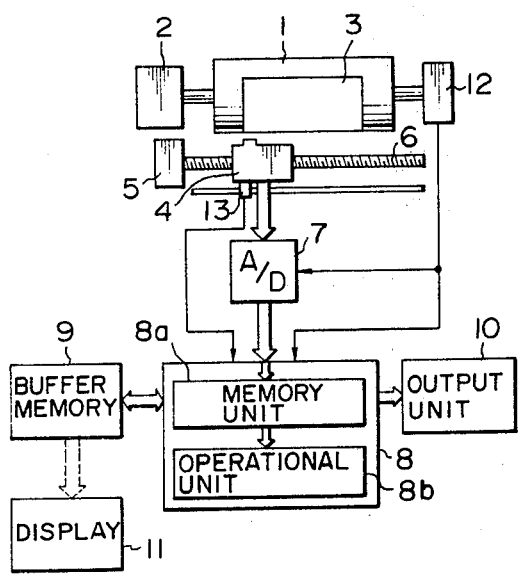
FIG. 5 is a block diagram of a machine for performing a method according to the present invention.

In FIG. 5 there is shown a machine for carrying out a method according to the present invention.

A picture cylinder 1 is rotated by a drive motor 2. An original picture 3 is mounted onto the picture cylinder 1. A pickup head 4 for scanning the original picture 3 to produce output color separation picture signals R, G and B of the primary colors red, greeen and blue, is movably mounted to a screw rod 6 which is driven by a motor 5.

The color separation picture signals R, G and B output from the pickup head 4 are sent to an analog-digital converter 7, hereinafter referred to as an A/D converter, in which the analog picture signals R, G and B are sampled in synchronization with timing pulses generated by a pulse generator 12 such as a rotary encoder which is coaxially mounted to the picture cylinder's shaft, and are converted into color separation digital picture signals.

Then, the digital picture signals are stored in a memory unit $8a$ of an operational means 8 which comprises a digital computer or the like. The digital picture signals read out of the memory unit $8a$ are then logarithmically converted into color separation density signal data $D_R$, $D_G$ and $D_B$. The color separation density signal data $D_R$, $D_G$ and $D_B$ are sent to an operational unit $8b$ of the operational means 8.

The operational means 8 outputs a data to an output unit 10. A display means 11 such as a color cathode ray tube (CRT) is connected to the operational means 8 via a buffer memory 9 which compensates for the difference of the frequency characteristics between the operational means 8 and the display means 11.

The logarithmic conversion of the color separation picture signals may be done prior to the A/D converter 7. The sampling pitch of the color separation digital picture signals converted in the A/D converter 7 are more roughly settled so as to prevent the capacity of the memory from increasing.

Figure 6A:
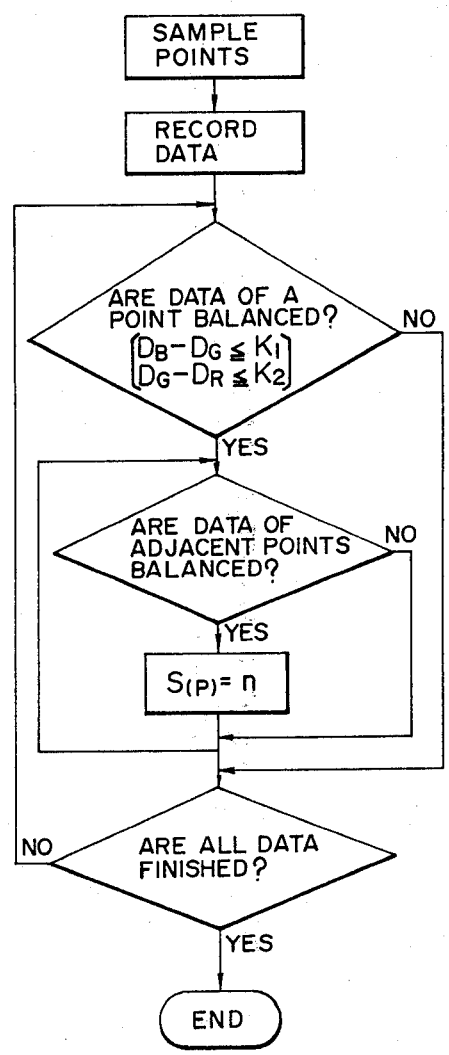
Figure 6B:
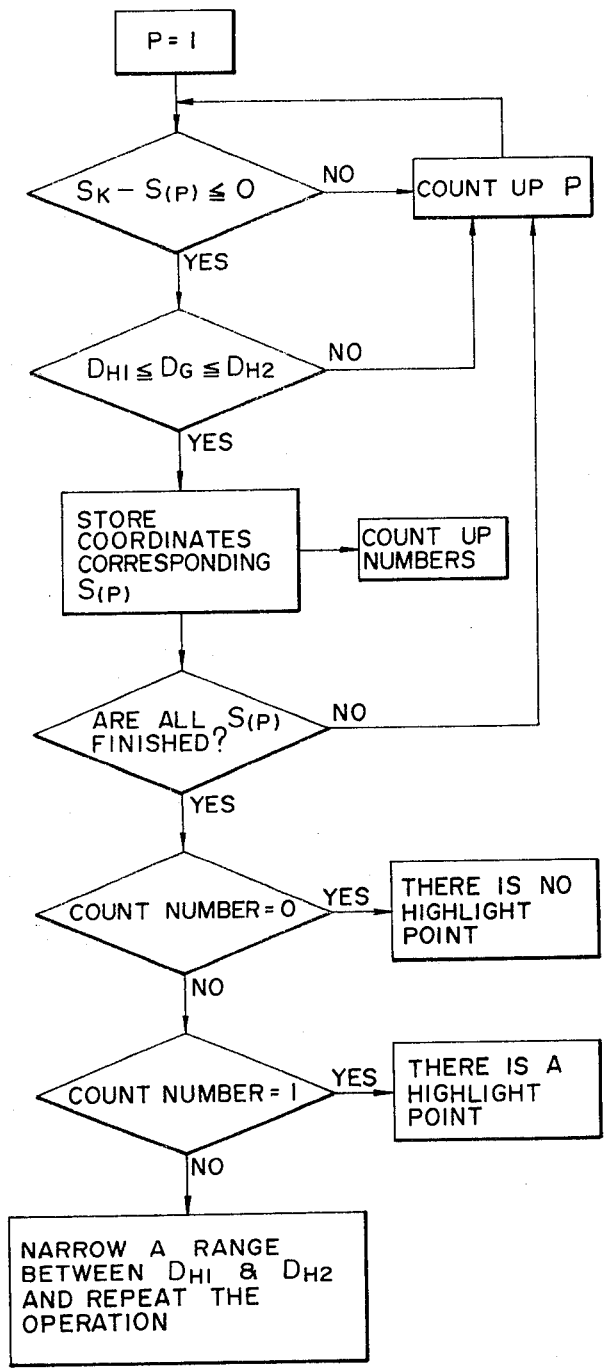

In FIGS. 6A and 6B are shown flow charts for detecting the highlight point and a density thereof by using the operational means 8 shown in FIG. 5. The density signal data $D_R$, $D_G$ and $D_B$ of a certain sampling picture element, which are read out of the memory unit $8a$, are operated according to the following formulae, for example, $D_B - D_G \leq K_1$ and $D_G - D_R \leq K_2$, wherein $K_1$ and $K_2$ are certain values, in order to discriminate as to whether the density signal data represented as $D_R$, $D_G$ and $D_B$ are balanced. That is, it is considered that when $D_B - D_G$ and $D_G - D_R$ are at least $K_1$ and $K_2$ (usually $K_1 = K_2 = 0.05$), they are balanced.

Now, after the density signal data $D_R$, $D_G$ and $D_B$ of a certain sampled picture element are considered to be balanced, the density signal data of the other sampling picture elements adjacent to the certain sampling picture element are discriminated one by one whether they are balanced or not, and a number S of the balanced sampling picture elements are counted. Then, an area S(P) of the sampling picture elements balanced is detected according to the numbers S of the balanced sampling picture elements.

Then, as shown in a flow chart of FIG. 6B, the balanced area S(P) is compared with a lower limit threshold area $S_K$ by subtracting the balanced area S(P) from the threshold area $S_K$. When the comparison result is at least zero, the green color density signal data $D_G$ is selected, for example, and is compared with predetermined threshold density values $D_{H1}$ and $D_{H2}$ ($D_{H1}$ is larger than $D_{H2}$) to carry out a determination, $D_{H1} \leq D_G \leq D_{H2}$. The coordinates of the sampling picture elements having the densities satisfying the formula $D_{H1} \leq D_G \leq D_{H2}$, are written in a register unit (not shown) of the operational means 8, and the number of the balanced area S(P) satisfying the conditions described above is counted in a counter (not shown) of the operational means 8.

After the comparison procedures described above of all of the balanced areas S(P) are finished, the number counted by the counter indicates the number of the highlight points selected. That is, when the counted number is nought, no highlight point exist, and when the counted number is one, the balanced area of the original picture corresponding to the coordinates written in the register of the operational means 8 is the highlight point. When the counted number is more than one, while the threshold density value $D_{H1}$ is not changed, the threshold density value $D_{H2}$ is gradually decreased in order to reduce the difference between the values $D_{H1}$ and $D_{H2}$, and the comparison procedures are repeated until the counted number becomes one, thereby determining the highlight point.

The coordinates and the density $D_G$ of the last balanced area S(P), i.e. the highlight point, are displayed in the output unit 10 shown in FIG. 5.

A rotary encoder 12 and linear encoder 13 shown in FIG. 5, detect the positions of the sampling picture elements as X-Y coordinates which correspond to the addresses of the register of the operational means 8.

According to the present invention the output unit 10 may be a printer so as to record the output value of a visible information as a character transfer information. The operator may use the character transfer information as a transfer medium for setting it into the picture reproducing machine such as a color scanner. The output unit 10 may also be a recorder using a recording medium such as a magnetic material or a paper tape, or the like. In this case, by using such a recording medium information recorded in a binary code may directly be settled or recorded electrically into the picture reproducing machine. Further, the signals fed to the output unit 10 may be directly input to the picture reproducing machine in an on-line system.

Although there are shown in FIGS. 6A and 6B the flow charts for detecting the highlight point and its density on the original picture, a shadow point and its density on the original picture may be also detected in a similar manner to the highlight point by reversing the signals in the negative-positive relation, and thus the detailed description thereof may be omitted.

Then, the gradation correction is carried out. First, the color separation density signals of the entire surface of the original picture, for example, the green color separation density signals $D_G$ whose densities are the closest to the visibility densities, are consecutively read out of the memory $8a$ of the operational means 8, and then a frequency distribution diagram of the densities is prepared by classifying them in the same manner as described above.

Therefore, each color separation density signal $D_G$ is compared with the border densities $D_1$, $D_2$ and $D_3$ shown in FIG. 1, which are predetermined corresponding to the original picture density range, i.e. the frequency distribution, one embodiment of which is shown in FIG. 7.

Then, the appearance frequency $N_1$, $N_2$ or $N_3$ of the color separation density signals $D_G$ included in each density range is counted by the register $R_1$, $R_2$ or $R_3$ corresponding to each density range. The appearance frequencies $N_1$, $N_2$ and $N_3$ are compared one another to obtain the rough gradation curve of the original picture.

Figure 8:
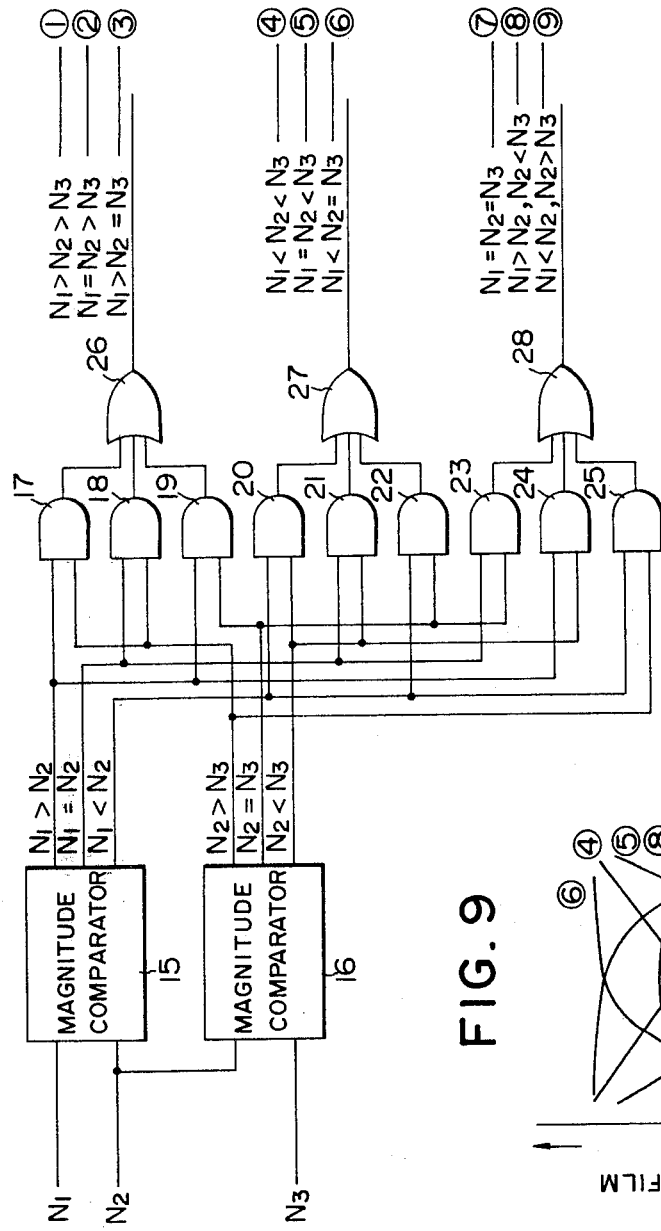
FIG. 8 represents a circuit for performing the operation represented by the fflow chart shown in FIG. 7.

In FIG. 8 is shown one embodiment of a device for performing the gradation detecting method described above, which comprises magnitude comparators 15 and 16, AND gates 17-25, and OR gates 26-28.

For example, two sets of the appearance frequencies $N_1$ and $N_2$ and $N_2$ and $N_3$ output from the registers $R_1$, $R_2$ and $R_3$ are sent to the magnitude comparators 15 and 16. When $N_1$ is larger than $N_2$, $N_1$ equals $N_2$; or $N_1$ is smaller than $N_2$, the magnitude comparator 15 outputs a high level signal H from one of its three different lines to the AND gates 17-25. When $N_2$ is larger than $N_3$, $N_2$ equals $N_3$; or $N_2$ is smaller than $N_3$, the magnitude comparator 16 outputs a high level signal H from one of its three different lines to the AND gates 17-25. Thus, the AND gate 17, 18, ..., or 25 outputs a signal when $N_1>N_2>N_3$ (1); $N_1=N_2>N_3$ (2); $N_1>N_2=N_3$ (3); $N_1<N_2<N_3$ (4); $N_1=N_2<N_3$ (5); $N_1<N_2=N_3$ (6); $N_1=N_2=N_3$ (7); $N_1>N_2$ and $N_2<N_3$ (8); or $N_1<N_2$ and $N_2>N_3$ (9), and then the OR gate 26, 27 or 28 outputs a discrimination signal $S_1$, $S_2$ or $S_3$.

Figure 9:
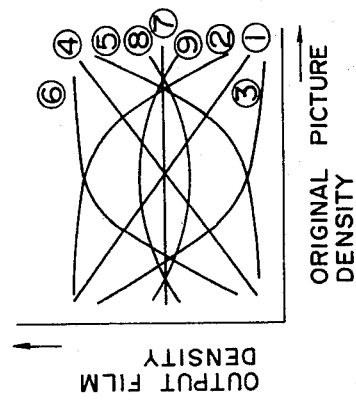
FIG. 9 shows examples of a gradation curve of an original picture.

Therefore, as shown in lines (1)–(9) of FIG. 9, the representative gradation characteristics of the original picture are classified into three tones, i.e. the high tone, the low tone, and the normal tone, depending on the relations among $N_1$, $N_2$ and $N_3$. When $N_1>N_2>N_3$ (1); $N_1=N_2>N_3$ (2); or $N_1>N_2=N_3$ (3), the OR gate 26 outputs the discrimination signal $S_1$ discriminating the high tone. When $N_1<N_2<N_3$ (4); $N_1=N_2<N_3$ (5); or $N_1<N_2=N_3$ (6), the OR gate 27 outputs the discrimination signal $S_2$ discriminating the low tone. When in the other cases, that is, $N_1=N_2=N_3$ (7); $N_1>N_2$ and $N_2<N_3$ (8); or $N_1<N_2$ and $N_2>N_3$ (9), the OR gate 28 outputs the discrimination signal $S_3$ discriminating the normal tone. As described above, therefore, the rough gradation characteristics of the original picture is detected.

Then, in order to detect more detail gradation characteristiics of the original picture, the appearance frequency distribution diagram of density of the sampling picture elements in the density sub-ranges, as shown in FIG. 2, must be obtained, but such a frequency distribution diagram can be obtained by using the flow charts shown in FIGS. 7 and 8. Hence, this operation can be omitted.

From the above descriptions, it is readily understood that according to the present invention the gradation characteristics curve of the original picture is detected relatively in detail, and can be classified depending on the gradation characteristics curve. Hence, a plurality of reproducible gradation curves corresponding to the classes are prepared in advance. By classifying the gradation curve of the original picture, one of the reproducible gradation curves corresponding thereto is selected, and at the same time the serial number attached to the reproducible gradation curve selected may be output to the output unit 10. Therefore, the reproducible gradation curve corresponding to the gradation curve of the original picture can be determined automatically or standardly.

Further, the color correction is carried out as follows. First, the color separation signal data R, G and B are read out of the memory unit 8a of the operational means 8 to the operational unit 8b thereof. In the operational unit 8b, color-corrected recording signal C, M and Y of cyan, magenta, and yellow colors are obtained in a digital manner according to the following formulae:

$$C = R - \alpha c \cdot G - \beta c \cdot B,$$

$$M = G - \alpha m \cdot B - \beta m \cdot R, \text{ and}$$

$$Y = B - \alpha y \cdot R - \beta y \cdot G,$$

wherein $\alpha c$, $\beta c$, $\alpha m$, $\beta m$, $\alpha y$ and $\beta y$ are fixed numbers, as disclosed in Japanese Patent Publication No. 50-14845. Then, from the color-corrected recording signals C, M and Y picture signal data y, m, c, o, v and g of yellow, magenta, cyan, orange, violet and green colors in hue are obtained in a digital manner according to the following formulae:

$$y = [(C-M)_+ + (Y-C)_-]_+$$

$$m = [(Y-C)_+ + (M-Y)_-]_+$$

$$c = [(M-Y)_+ + (C-M)_-]_+$$

$$o = [(M-Y)_+ + (Y-C)_-]_+$$

$$v = [(C-M)_+ + (M-Y)_-]_+$$

$$g = [(Y-C)_+ + (C-M)_-]_+$$

In these formulae, for example, $(C-M)_+$ means the selection of the positive value of the subtraction $(C-M)$, $(Y-C)_-$ means the selection of the negative value of the subtraction $(Y-C)$, and so forth.

Then, the frequency distribution of density of each of the picture signal data of the six colors is obtained, and according to the frequency distribution of density the gradation characteristics of each picture signal data is classified in the same manner as the gradation correction operation described above, resulting in automatically selecting a reproducible gradation curve corresponding to the class classified. At the same time the serial number attached to the reproducible gradation curve is output to the output unit 10.

When the color correction is carried out by correcting the gradation of each picture signal data of the six colors, the density range of the picture signal data is often off the standard reproducible density range of the picture reproducing machine, and further many sampling picture elements often gather in a density range which is off the standard reproducible density range and is an important part of the picture pattern of the original picture.

In such a case, for example, as shown in FIG. 4, the transformation of the density range is preferably carried out together with the gradation transformation, and this is preferably done per each picture signal data of six colors in hue.

Hence, according to the present invention, such a density range transformation is performed by selecting one of the density correction lines, as shown in FIG. 4, which are settled or recorded in the operational means 8 in advance, and the serial number attached to the density correction line selected is output to the output unit 10. Then, according to the serial number of the density correction line the picture reproducing machine is set up so that the density range off the standard reproducible density range may be transformed into the standard reproducible density range.

Meanwhile, when the highlight point is detected, some balanced areas wherein the three color separation signal data R, G and B are balanced as described above, are displayed on the display means 11. The operator can point out the highlight point on the display means 11 by using a light pen, or the like, and the portions corresponding to a certain color on the original picture may be picked up and displayed on the display means 11.

In practice, it is preferable that the setup conditions are automatically determined according to the present invention, the result is displayed on the display means 11, and then the operator further makes corrections, as the occasion demands, thereby finally determining the setup conditions to obtain the desired final results.

Since it is necessary to send the three color separation picture signals B, G and R to the display means 11, the recording ink color signals Y, M, C and $B_K$ should be converted into the color separation picture signals B, G and R in the operational means 8, as disclosed in Japanese Patent Laying-Open Specification No. 50-159610.

Although the present invention has been described with reference to a preferred embodiment thereof, however, many changes and modifications thereof can be made by those skilled in the art without departing from the scope of the present invention. For example, a color television camera may also be used instead of the pickup head of the picture reproducing machine such as a color scanner in order to improve the operativity. These, and other such modifications, are intended to be included within the scope of the present invention.

What is claimed is:

1. A method for automatically determining color control conditions for a picture being reproduced for use in a picture reproducing machine, wherein an original picture is scanned photoelectrically to pick up color separation picture signal data of the primary colors comprising the steps of:

classifying color separation picture signal data into three color separation signals $D_R$, $D_G$ and $D_B$ of said primary colors so as to obtain a distribution condition based upon density measurements relating to the entire density range of said original picture;

establishing color control conditions according to said distribution condition determined by the density of certain sampling picture elements whose color separation picture signal data is included within the density range of said original picture and with which each of the sampled B, G and R signal values are compared; and detecting and comparing densities of further sampled picture elements adjacent to said detected circuit sampling picture elements, thereby determining points which are comparable to portions of said original picture.

2. A method as defined in claim 1, wherein, when a plurality of said points are detected, the one whose color separation picture signal data values are balanced best, is selected, thereby determining a highlight point.

3. A method as defined in claim 1, wherein, when a plurality of said points are detected, the one whose color separation picture signal data values are balanced best, is selected, thereby determining a shadow point.

4. A method for automatically determining color control conditions for a reproduction picture for use in a picture reproducing machine wherein an original picture is scanned photoelectrically to pick up color separation picture signal data of primary colors, comprising the steps of:

classifying color separation picture signal data into groups to obtain a distribution condition; and determining color control conditions according to said distribution condition;

wherein the density of said color separation picture signal data of each sampling picture element is classified in density ranges by comparing the density of said color separation picture signal data with border densities of the density ranges to obtain a frequency distribution of density of said color separation picture signal data, wherein a gradation of said original picture is classified according to the frequency distribution of density, and wherein one of reproducible gradation curves predetermined for the original picture is selected depending on the classification result.

5. A method as defined in claim 4, wherein each density range is further divided into density sub-ranges.

6. A method as defined in claim 4 or 5, wherein, when the density range of the color separation picture signal data is outside a standard reproducible density range of the picture reproducing machine, the density range of the color separation picture signal data, partly outside the standard reproducible density range is simply converted to the maximum or the minimum value of the reproducible density range.

7. A method as defined in claim 4 or 5, wherein, when the density range of the color separation picture signal data is outside a standard reproducible density range of the picture reproducing machine, the density range of the color separation picture signal data is transformed to the standard reproducible density range according to a gradation correction curve which is predetermined depending on the density range of the color separation picture signal data, partly outside the standard reproducible density range.

8. A method for automatically determining color control conditions for a reproduction picture for use in a picture reproducing machine wherein an original picture is scanned photoelectrically to pick up color separation picture signal data of primary colors, comprising the steps of:

classifying color separation picture signal data into groups to obtain a distribution condition; and determining color control conditions according to the distribution condition;

wherein from the color separation picture signal data of each sampling picture element, picture reproduction signal data divided into a plurality of colors in hue are obtained, wherein the density of each picture reproduction signal data is classified in density ranges by comparing the density of said picture reproduction signal data with border densities of the density ranges to obtain a frequency distribution of density of said picture reproduction signal data, wherein a gradation of said picture reproduction signal data is classified according to the frequency distribution of density, and wherein one of reproducible gradation curves predetermined for said picture reproduction signal data is selected depending on the classification result.

9. A method as defined in claim 8, wherein each density range is further divided into density sub-ranges.

10. A method as defined in claim 8 or 9, wherein, when the density range of the picture reproduction signal data is outside a standard reproducible density range of the picture reproducing machine, the density range of the picture reproduction signal data is transformed to the standard reproducible density range according to a gradation correction curve which is predetermined depending on the density range of the picture reproduction signal data, partly outside the standard reproducible density range.

* * * * *